United States Patent Office 3,129,151
Patented Apr. 14, 1964

3,129,151
CONVERSION OF ALKALI METAL FLUORIDES TO CHLORIDES
Howard M. Dess and Donald J. Hansen, Niagara Falls, N.Y., assignors to Union Carbide Corporation, a corporation of New York
No Drawing. Filed Dec. 22, 1960, Ser. No. 77,501
4 Claims. (Cl. 204—64)

The present invention relates to a method of converting alkali metal fluorides to alkali metal chlorides in fused alkali metal baths.

A problem often encountered in the electrolysis of the metals of groups IVB, VB and VIB of the periodic table in mixed chloride-fluoride fused salt electrolytes is the gradual buildup of the fluoride concentration to undesirably high levels. This results in an increase in the melting point of the fused electrolyte thereby requiring higher temperatures to sustain a useable fused electrolyte.

For example in the production of tantalum by a fused salt electrolytic method, potassium fluorotantalate is added to a molten sodium chloride electrolyte. During electrolysis tantalum is liberated at the cathode, chlorine is liberated at the anode and the fluoride constituent of the fluorotantalate remains in the fused alkali metal electrolyte to form alkali metal fluorides.

As electrolysis proceeds, the concentration of alkali metal fluoride salt builds up. The viscosity of the melt increases as this occurs so that higher temperatures are necessary in order to maintain the efficiency of the electrolysis. This means greater power expenditure, more corrosion problems and more operating difficulties in general as temperature is raised. Finally the fluoride concentration becomes high enough that fluorine tends to be liberated and to attack the anode. The process efficiency then falls off and electrolysis must be stopped. When this extent of fluoride concentration is reached the electrolyte must be replaced by a fresh supply of electrolyte which is free of fluorides. This procedure entails a series of inconveniences such as shut-down time, wasted fluorine values, quality variation, etc.

It is an object of the present invention to provide a process for the conversion of alkali metal fluorides to alkali metal chlorides in fused alkali metal baths.

It is another object of the present invention to provide a process for conversion of alkali metal fluorides to alkali metal chlorides in fused alkali metal baths and removal of hydrogen fluoride from fused alkali metal chloride salts.

It is another object of the present invention to provide a process for removing fluorine values from fused salt electrolytes containing alkali metal chloride and fluoride.

It is another object to provide a substantially continuous electrolytic process for electrolysis of metal of groups IVB, VB and VIB of the periodic table which does not require replacement of the electrolyte because of fluoride contamination for substantially extended periods.

It is a further object of the present invention to provide a method of recovering valuable fluorine values directly from fluoride contaminated fused salt electrolytes.

Other objects will be apparent from the remaining disclosure and the appended claims.

The above-mentioned objects of the present invention are accomplished by the addition of gaseous hydrogen chloride to a fused alkali metal bath containing at least one alkali metal fluoride. The fluoride contaminant in the bath replaces the chloride constituent in hydrogen chloride and hydrogen fluoride is evolved from the melt. This reaction is unexpected. In general, hydrogen chloride is thought not to react with an alkali metal fluoride to produce hydrogen fluoride and an alkali metal chloride. The reaction may be noted as follows:

$$HCl(g) + F^-(\text{molten salt}) \rightleftharpoons HF(g) + Cl^-(\text{molten salt})$$

There are several critical conditions to be adhered to in successfully conducting the above-mentioned process. The temperature during the reaction must be maintained at a level sufficient to allow the alkali metal chloride bath to remain in the fused condition. A temperature ranging from the melting point to 1000° C. is preferred. In fused sodium chloride the bath is preferably maintained at approximately 820° C.

Anhydrous hydrogen chloride is preferred in the present process. In addition, during the electrolysis of refractory metals in fused salt baths it is specifically desired that water contamination be as low as possible to prevent corrosion of the apparatus.

The extent to which fluoride contaminants can be removed from the bath is largely dependent upon the length of time that hydrogen chloride is allowed to contact the bath. The extent of removal of fluoride from the bath is proportional to the length of time that hydrogen chloride is introduced when all other factors are constant. However, the efficiency of HCl utilization is highest when the fluoride content of the bath is highest also. About 0.25 to 1 liter per minute of hydrogen chloride has ben found to give good results.

The hydrogen fluoride gas evolved from the melt during the above-mentioned process can be collected for reuse in a variety of known ways including absorption in sodium hydroxide and/or by condensing the gas at low temperatures.

The following embodiment of the present process indicates that about 80 percent efficiency is realized in relation to the amount of hydrogen chloride added.

A salt mixture containing 35.2 percent NaCl, 28.1 percent NaF and 36.7 percent KF (21.4 percent Cl, 24.5 percent F and 54.1 percent Na+K) was loaded into a graphite container in a stainless steel reactor. The reactor was sealed and flushed with argon, and heated under an argon atmosphere to 800° C. to melt the charge. Anhydrous hydrogen chloride gas was passed through the melt for a period of 120 minutes at a rate of approximately 0.5 liter per minute by means of a stainless steel tube dipping beneath the surface. This represents approximately 94 percent of the HCl needed for total replacement of all F by Cl. The off-gases from the reactor were absorbed continuously in NaOH solution. After stopping the flow of HCl, the system was cooled and a sample of the salt and sample of the caustic scrubbing solution was also taken for analysis. The analysis of the salt showed 43.74 percent Cl and 4.0 percent F, and the scrubbing solution contained 0.51 g./l. of Cl and 1.32 g./l. of F. Accordingly, the overall average efficiency of HCl utilization was substantially better than 80 percent.

The present process may be advantageously utilized to regenerate electrolytes which are used in fused salt electrolytic processes for refining metals of groups IVB, VB and VIB, for example wherein fluoride build-up presents a major problem. The following embodiment illustrates a process for removal of fluoride contaminants from fused, alkali metal chloride electrolytes during electrolytic deposition of tantalum. Note that the process allows substantially continuous electrolytic deposition without changing the electrolyte while valuable fluorine values are recovered in a form readily amenable for use in preparing the starting tantalum compound.

Potassium fluotantalate may be charged into a fused sodium chloride electrolyte maintained at a temperature ranging from about 810° C. to about 1000° C. under an argon atmosphere. Electrolysis is initiated. Anhydrous hydrogen chloride may be introduced below the surface of the electrolyte and adjacent to the anode at a rate ranging from about 0.25 to about 1 liter per minute. Hydrogen fluoride gas is evolved and may be collected in a sodium hydroxide solution or conducted to a condensing unit. The electrolyte is thereby maintained at a fluoride content below that content which causes a detrimental increase in the melting point of the electrolyte and the electrolytic process can be conducted substantially without interruption while cathodic tantalum is being continuously produced. The recovered hydrogen fluoride may be recycled to produce additional fluotantalate for use as a starting tantalum bearing compound in further electrolytic refining of tantalum.

The process shown immediately above is particularly suitable for treating the metals of groups IVB, VB and VIB of the periodic table.

What is claimed is:

1. In electrolytic deposition processes for the production of metal wherein a fused alkali metal bath is utilized as an electrolyte, the improvement comprising introducing hydrogen chloride into a substantially anhydrous, fused salt bath containing at least one fused alkali metal fluoride and reacting said hydrogen chloride with said fused alkali metal fluoride to form alkali metal chloride and hydrogen fluoride.

2. In electrolytic deposition processes for the production of tantalum metal from fluorotantalate starting materials wherein a substantially anhydrous fused alkali metal chloride bath is present as an electrolyte the improvement comprising introducing hydrogen chloride into said fused salt bath and reacting the hydrogen and the chlorine in said hydrogen chloride respectively with the fluorine component evolved during electrolysis of said fluorotantalate and the alkali metal in said fused alkali metal bath to form alkali metal chloride and hydrogen fluoride and recovering said hydrogen fluoride.

3. In the electrolytic deposition process for the production of metal wherein a substantially anhydrous fused alkali metal chloride bath containing at least one fused alkali metal fluoride is present as an electrolyte and wherein gaseous chlorine is liberated at the anode, the improvement which comprises introducing gaseous hydrogen chloride in the immediate vicinity of said anode and reacting said hydrogen chloride with the alkali metal fluoride to form alkali metal chloride and hydrogen fluoride and recovering said hydrogen fluoride.

4. In an electrolytic deposition process for the production of tantalum metal from fluorotantalate starting materials wherein a substantially anhydrous fused alkali metal chloride bath is present as an electrolyte and wherein gaseous chlorine is liberated at the anode the improvement comprising introducing hydrogen chloride in the immediate vicinity of said anode and reacting said hydrogen chloride with the fluoride component evolved during electrolysis of said fluorotantalate to form alkali metal chloride and hydrogen fluoride and recovering hydrogen fluoride.

References Cited in the file of this patent

UNITED STATES PATENTS

| | | |
|---|---|---|
| 2,832,669 | Allen | Apr. 29, 1958 |
| 2,899,369 | Slatin | Aug. 11, 1959 |
| 2,967,759 | Wainer | Jan. 10, 1961 |

FOREIGN PATENTS

| | | |
|---|---|---|
| 221,298 | Australia | Apr. 17, 1959 |
| 1,068,472 | Germany | Nov. 5, 1959 |

OTHER REFERENCES

Mellors: "Compositive Treatise on Inorganic and Theoretical Chemicals," volume 2, page 516, lines 21–23.